United States Patent
Jeffries

(10) Patent No.: US 6,272,442 B1
(45) Date of Patent: Aug. 7, 2001

(54) TAKING IN-USE COMPUTER DRIVES OFFLINE FOR TESTING

(75) Inventor: Ken Jeffries, Leander, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/245,146

(22) Filed: Feb. 4, 1999

(51) Int. Cl.⁷ .................................................. G01M 1/00
(52) U.S. Cl. ............................ 702/115; 702/81; 702/82; 702/108; 702/117
(58) Field of Search .................... 702/81, 82, 108, 702/117, 118, 119, 123, 182, 183, 185, 186, FOR 103, 104, 134, 135, 137, 170, 171; 360/31, 15, 69, 71, 75; 369/54; 711/114; 714/6

(56) References Cited

U.S. PATENT DOCUMENTS

| | | | |
|---|---|---|---|
| 5,148,432 | * 9/1992 | Gordon et al. | 371/10.1 |
| 5,371,882 | * 12/1994 | Ludlam | 395/575 |
| 5,621,887 | 4/1997 | Chatterji . | |
| 5,654,841 | * 8/1997 | Hobson et al. | 360/75 |
| 5,661,615 | * 8/1997 | Waugh et al. | 360/75 |
| 5,727,144 | 3/1998 | Brady et al. . | |
| 5,815,722 | * 9/1998 | Kalwitz et al. | 395/712 |
| 5,848,230 | * 12/1998 | Walker | 395/182.05 |
| 5,894,425 | * 8/1999 | Saliba | 364/708.1 |
| 5,909,691 | * 1/1999 | Schultz et al. | 711/4 |
| 6,070,249 | * 5/2000 | Lee | 714/6 |
| 6,098,119 | * 8/2000 | Surugucchi et al. | 710/10 |
| 6,138,176 | * 10/2000 | McDonald et al. | 710/6 |
| 6,148,349 | * 11/2000 | Chow et al. | 710/33 |
| 6,178,524 | * 1/2001 | Taylor | 714/36 |

* cited by examiner

Primary Examiner—Marc S. Hoff
Assistant Examiner—Carol S Tsai
(74) Attorney, Agent, or Firm—Haynes and Boone, L.L.P.

(57) ABSTRACT

A method and system to enable extended testing of computer system drives that allows concurrent processing of input/output requests directed at the physical drive being tested, the computer system having a plurality of drives, a drive testing program stored in the computer's memory, and a drive exchange program stored in the computer's memory. The drive exchange program includes the steps of a) copying information and writes from a drive to be tested to a spare drive, b) logically replacing the drive to be tested with the spare drive, c) interfacing with the drive testing program, and d) allowing the drive testing program to test the drive to be tested.

14 Claims, 1 Drawing Sheet

TAKING IN-USE COMPUTER DRIVES OFFLINE FOR TESTING

TECHNICAL FIELD

The disclosures herein relate to the field of computer drive management systems, and, more particularly, to a system and a method for logically removing computer drives from online arrays for extended periods of testing.

BACKGROUND OF THE INVENTION

S.M.A.R.T., an acronym for self-monitoring analysis and reporting technology, is an industry term of art used to describe the technology used to monitor and predict device performance. Drive failure prediction mechanisms, such as S.M.A.R.T., monitor various components of the drive in order to predict whether a drive might fail in the future. S.M.A.R.T. technology consists of software that resides both on the drive and on the host computer. The drive software monitors various components of the drive, while the host software interfaces with the drive, and determines whether the drive is functioning up to predetermined reliability standards.

In order to increase the performance of future versions of S.M.A.R.T., and similar drive failure prediction mechanisms, such mechanisms will need to be able to test drives offline for extended periods of time. However, the drives that need to be tested offline are often online, in use, and, therefore not available for extended periods of offline testing. Accordingly, what is needed is a system and a method for taking online drives offline, that allows concurrent processing of input/output requests directed at the physical drive being taken offline.

SUMMARY

The embodiment accordingly, provides a method and system to enable extended testing of computer system drives that allows concurrent processing of input/output requests directed at the physical drive being tested, the computer system having a plurality of drives, a drive testing program stored in the computer's memory, and a drive exchange program stored in the computer's memory, the drive exchange program comprising the steps of a) copying information and writing from a drive to be tested to a spare drive, b) logically replacing the drive to be tested with the spare drive, c) interfacing with the drive testing program, and d) allowing the drive testing program to test the drive to be tested.

DETAILED DESCRIPTION OF THE PREFERRED EMBODIMENT

Figure 1:
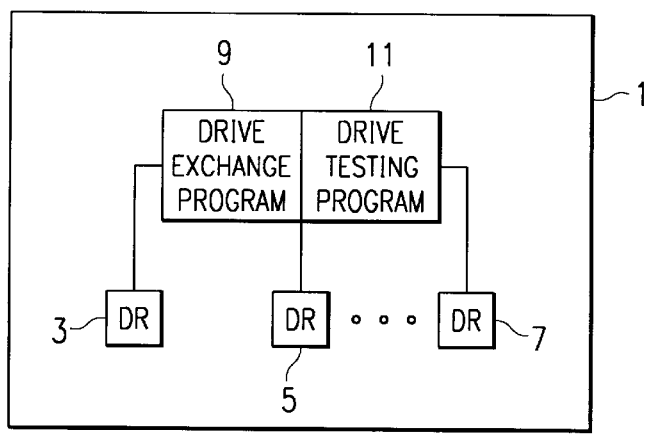
FIG. 1 is a block diagram depicting an apparatus of the preferred embodiment.

Referring to FIG. 1, the invention includes a computer 1, having a plurality of drives 3, 5, and 7 that interface with a drive exchange program 9 and a drive testing program 11. The plurality of drives 3, 5, and 7 may comprise single drives, JBOD arrays (just a bunch of disks), or RAID (redundant array of inexpensive (independent) drives) arrays.

Figure 2:
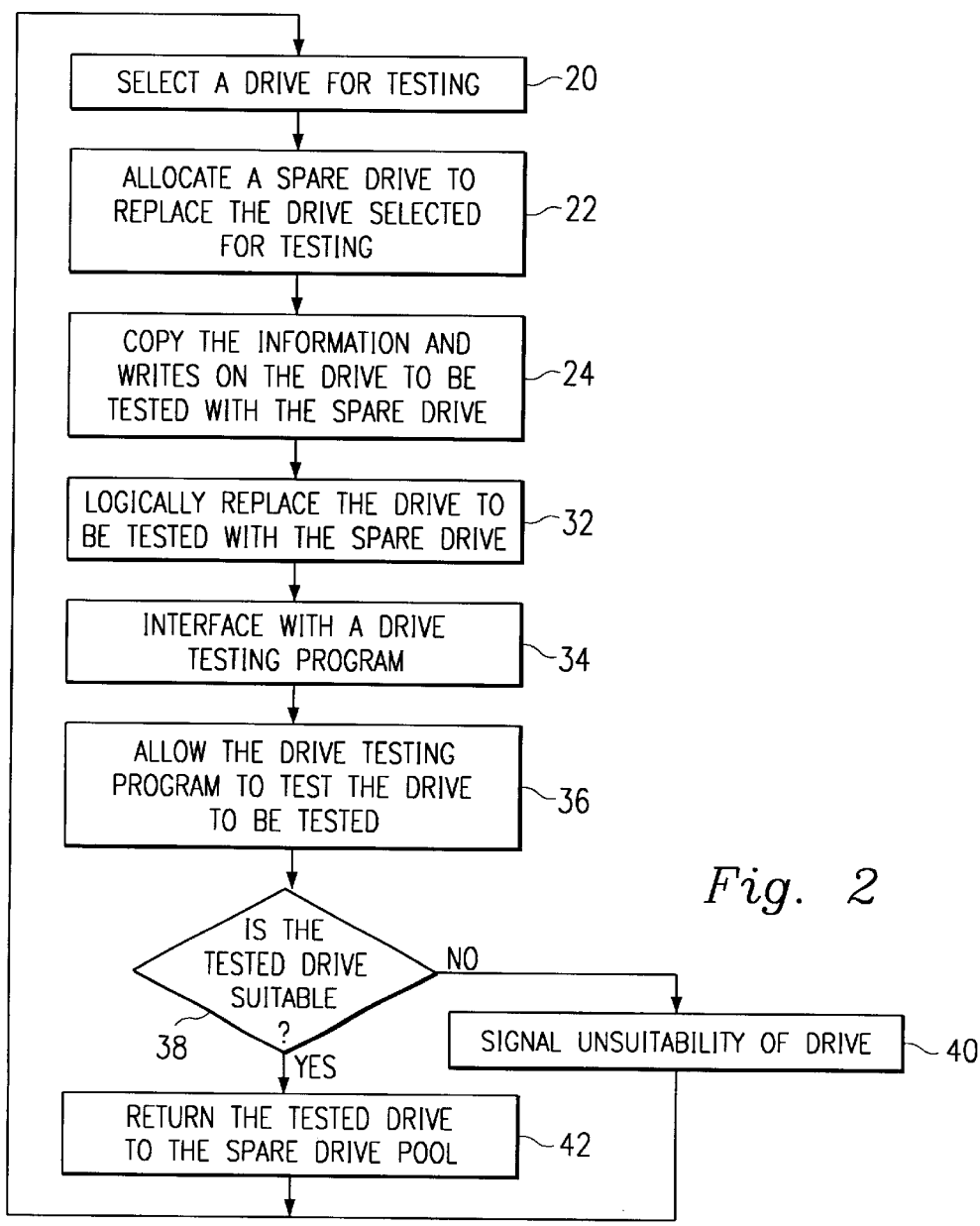
FIG. 2 is a flow chart depicting a method of the preferred embodiment.

Referring to FIG. 2, in step 20, the drive exchange program 9 selects a drive for testing based on certain drive failure prediction standards (e.g., time scheduled, total number of input/output requests, elevated drive errors). In step 22, the program allocates a spare drive to replace the drive selected for testing. In step 24, the program copies the information and writes from the drive to be tested onto the spare drive. In step 32, the program logically replaces the drive to be tested with the spare drive. In step 34, the program interfaces with a drive testing program 11. In step 36, the program allows the drive testing program 11 to test the drive to be tested for as long as necessary. In step 38, the program queries whether the tested drive is suitable for use. If the drive testing program 11 indicates that the tested drive is not suitable for use, then, in step 40, the program signals the unsuitability of the tested drive to the user. If the drive testing program 11 indicates that the tested drive is suitable for use, then, in step 42, the program returns the tested drive to the pool of spare drives for future use. After the program identifies the tested drive's suitability for use, the program returns to step 20, and selects another drive for testing.

Although illustrative embodiments have been shown and described, a wide range of modification, changes and substitution is contemplated in the foregoing disclosure. In some instances, some features of the disclosed embodiments may be employed without a corresponding use of the other features. Accordingly, it is appropriate that the appended claims be construed broadly and in a manner consistent with the scope of the embodiments disclosed herein.

What is claimed is:

1. A computer system comprising a plurality of drives, a memory, a drive testing program stored in the memory, and a drive exchange program stored in the memory, the drive exchange program having instructions for performing the following steps:
   a. copying information and writes from a drive to be tested to a spare drive;
   b. logically replacing the drive to be tested with the spare drive;
   c. interfacing with the drive testing program; and
   d. after the step of copying information and writing from the drive to be tested to the spare drive, allowing the drive testing program to test the drive to be tested.

2. The computer system of claim 1, further comprising, before the step of copying information and waiting from a drive to be tested to a spare drive, the steps of selecting a drive for testing and allocating a spare drive to replace the drive selected for testing.

3. The computer system of claim 2, further comprising, after the step of allowing the drive testing program to test the drive to be tested, the steps of querying whether the tested drive is suitable for use, if the tested drive is unsuitable for use, signaling the user of the unsuitability of the drive, and if the tested drive is suitable for use, returning the tested drive to the pool of spare drives.

4. The computer system of claim 3, wherein the plurality of drives comprises JBOD arrays.

5. The computer system of claim 3, wherein the plurality of drives comprises RAID arrays.

6. A computer system comprising a plurality of drives, a memory, a drive testing program stored in the memory, and a drive exchange program stored in the memory, the drive exchange program having instructions for performing the following steps:
   a. selecting a drive for testing;
   b. allocating a spare drive to replace the drive selected for testing;
   c. copying information and writing from the drive to be tested to the spare drive;

d. logically replacing the drive to be tested with the spare drive;
e. interfacing with the drive testing program;
f. after the step of copying information and writing from the drive to be tested to the spare drive, allowing the drive testing program to test the drive to be tested;
g. querying whether the tested drive is suitable for use;
h. if the tested drive is unsuitable for use, signaling the user of the unsuitability of the drive; and
i. if the tested drive is suitable for use, returning the tested drive to the pool of spare drives.

7. The computer system of claim 6, wherein the plurality of drives comprises JBOD arrays.

8. The computer system of claim 6, wherein the plurality of drives comprises RAID arrays.

9. A method to enable extended testing of computer system drives that allows concurrent processing of input/output requests directed at the physical drive being tested, the computer system having a plurality of drives, a memory, a drive testing program stored in the memory, and a drive exchange program stored in the memory, the method comprising the steps of:
   a. copying information and writing from a drive to be tested to a spare drive;
   b. logically replacing the drive to be tested with the spare drive;
   c. interfacing with the drive testing program; and
   d. after the step of copying information and writing from the drive to be tested to the spare drive, allowing the drive testing program to test the drive to be tested.

10. The method of claim 9, further comprising the step of querying whether the tested drive is suitable for use.

11. The method of claim 10, further comprising, if the tested drive is unsuitable for use, the step of signaling the user of the unsuitability of the drive.

12. The method of claim 11, further comprising, if the tested drive is suitable for use, the step of returning the tested drive to the pool of spare drive.

13. The method of claim 12, further comprising the step of first selecting a drive for testing.

14. A method to enable extended testing of computer system drives that allows concurrent processing of input/output requests directed at the physical drive being tested, the computer system having a plurality of drives, a memory, a drive testing program stored in the memory, and a drive failure prediction program stored in the memory, the method comprising the steps of:
   a. selecting a drive for testing;
   b. allocating a spare drive to replace the drive selected for testing;
   c. copying information and writing from the drive to be tested to the spare drive;
   d. logically replacing the drive to be tested with the spare drive;
   e. interfacing with the drive testing program; and
   f. after the step of copying information and writing from the drive to be tested to the spare drive, allowing the drive testing program to test the drive to be tested;
   g. querying whether the tested drive is suitable for use;
   h. if the tested drive is unsuitable for use, signaling the user of the unsuitability of the drive; and
   i. if the tested drive is suitable for use, returning the tested drive to the pool of spare drives.

* * * * *